*J. L. Colburn,*
*Butter Worker.*
No. 76,304. Patented Apr. 7, 1868.
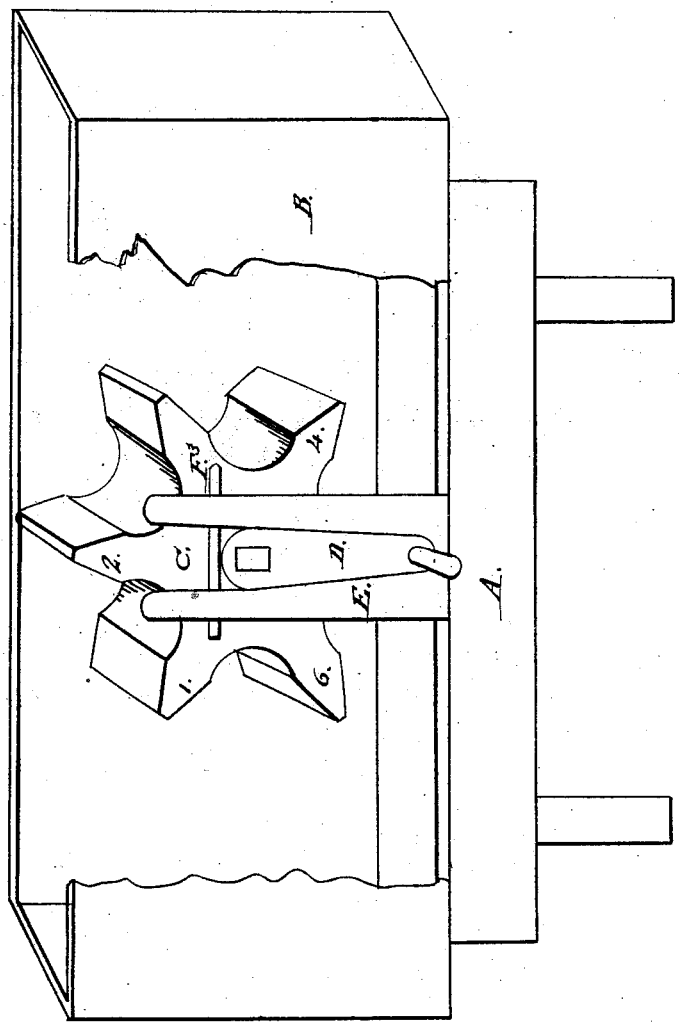
Witnesses:
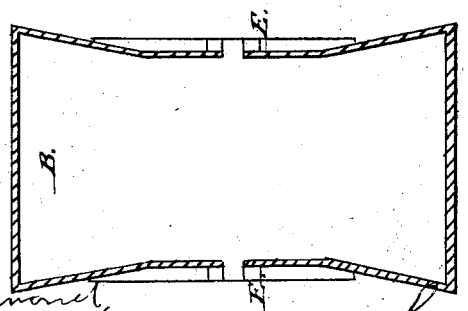
Inventor:
Lester L. Colburn

United States Patent Office.

JUSTIN L. COLBURN, OF WEST BURKE, VERMONT.

Letters Patent No. 76,304, dated April 7, 1868.

IMPROVEMENT IN BUTTER-WORKERS.

*The Schedule referred to in these Letters Patent and making part of the same.*

TO ALL WHOM IT MAY CONCERN:

Be it known that I, JUSTIN L. COLBURN, of West Burke, in the county of Caledonia, in the State of Vermont, have invented a new and improved Butter-Worker; and I do hereby declare the following to be a full and exact description thereof, reference being had to the letters of reference marked thereon.

The nature of my invention consists in a box, in which is a wheel constructed with long cogs, and so arranged that, when the wheel is revolved, which is done by means of a common crank, the butter, which is placed in one end of the box, is drawn under the wheel, and deposited at the other end of the box, and, by reversing the motion of the wheel, the butter is again drawn under the wheel, and so, by means of a continuous working of the wheel in the manner described, the butter is worked.

In order more fully to describe my invention, I will refer more directly to the accompanying drawings, which form a part of this specification.

Figure 1 shows my invention complete, with one side of the box removed, so as to show the construction more perfectly.

A is a framework, on which the box B rests. C is the wheel already described, with the cogs 1, 2, 3, 4, 5, and 6. D is the crank, by which the wheel C is revolved. E and its counterpart, which is not shown, are posts, with a slant cut in the top, for the axle of the wheel C to rest in. F is a pin running through the post, over the axle, so as to prevent the wheel from lifting.

Figure 2 shows a top view of the box B, showing the posts E E.

This figure shows the shape of the sides of the box, which, as will be seen, are concave. These are so constructed for the purpose of concentrating the butter as it is drawn under the wheel C by the cogs 1, 2, 3, 4, 5, and 6.

What I claim as my invention, and desire to secure by Letters Patent of the United States, is as follows, to wit:

I claim the wheel C, constructed as described, operated by the crank D, in combination with the box B, when the same are constructed as described in the aforesaid combination.

JUSTIN L. COLBURN.

Witnesses:
A. B. RICHMOND,
JAS. K. HALLOCK.